(12) United States Patent
Alon et al.

(10) Patent No.: US 10,936,722 B2
(45) Date of Patent: Mar. 2, 2021

(54) BINDING OF TPM AND ROOT DEVICE

(71) Applicant: NUVOTON TECHNOLOGY CORPORATION, Hsin-chu (TW)

(72) Inventors: Moshe Alon, Tel-Aviv (IL); Ziv Hershman, Givat Shmuel (IL); Dan Morav, Herzliya (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 238 days.

(21) Appl. No.: 15/955,703

(22) Filed: Apr. 18, 2018

(65) Prior Publication Data

US 2019/0325140 A1 Oct. 24, 2019

(51) Int. Cl.
*G06F 7/04* (2006.01)
*G06F 21/57* (2013.01)
*H04L 9/32* (2006.01)

(52) U.S. Cl.
CPC .......... *G06F 21/575* (2013.01); *G06F 21/572* (2013.01); *H04L 9/3271* (2013.01); *G06F 2221/033* (2013.01)

(58) Field of Classification Search
CPC ................. G06F 21/575; G06F 21/572; G06F 2221/033; H04L 9/3271
See application file for complete search history.

(56) References Cited

U.S. PATENT DOCUMENTS

| | | | | |
|---|---|---|---|---|
| 2002/0129246 A1* | 9/2002 | Blumenau | ............. | G06F 21/602 713/168 |
| 2003/0221114 A1* | 11/2003 | Hino | ........................ | G06F 21/31 713/189 |
| 2005/0283601 A1* | 12/2005 | Tahan | .................... | G06F 21/575 713/2 |
| 2006/0155988 A1* | 7/2006 | Hunter | ................... | G06F 21/575 713/164 |
| 2008/0126779 A1* | 5/2008 | Smith | .................... | G06F 21/575 713/2 |
| 2008/0282348 A1* | 11/2008 | Proudler | ................. | G06F 21/57 726/22 |
| 2009/0216980 A1* | 8/2009 | Asahi | ..................... | G06F 21/445 711/163 |
| 2012/0130874 A1* | 5/2012 | Mane | ...................... | H04L 63/08 705/34 |
| 2012/0151223 A1* | 6/2012 | Conde Marques | ......................... | G06F 21/6218 713/193 |
| 2015/0220742 A1* | 8/2015 | Ouyang | .................. | G06F 21/32 713/189 |
| 2018/0293080 A1* | 10/2018 | Rothman | .............. | G06F 3/0685 |
| 2019/0050602 A1* | 2/2019 | Sela | .................... | G06F 12/1416 |

* cited by examiner

*Primary Examiner* — Darshan I Dhruv

(74) *Attorney, Agent, or Firm* — Kligler & Associates Patent Attorneys Ltd

(57) ABSTRACT

A method for initializing a computer system, which includes a Central Processing Unit (CPU), a Trusted Root Device and a Trusted Platform Module (TPM), includes authenticating a boot code of the CPU using the Trusted Root Device, and booting the CPU using the authenticated boot code. A challenge-response transaction, in which the TPM authenticates the Trusted Root Device, is initiated by the CPU following booting of the CPU. Only in response to successful authentication of the Trusted Root Device using the challenge-response transaction, a resource used in operating the computer system is released from the TPM.

8 Claims, 1 Drawing Sheet

BINDING OF TPM AND ROOT DEVICE

FIELD OF THE INVENTION

The present invention relates generally to computer-system security, and particularly to methods and systems for binding between a Trusted Platform Module (TPM) and a Root Device.

BACKGROUND OF THE INVENTION

Some computer systems comprise a Trusted Root Device (TRD). The TRD typically comprises a device that behaves in a consistent and expected manner, performs verified boot, enforces boot policies and authenticates the computer-system boot code.

SUMMARY OF THE INVENTION

An embodiment of the present invention that is described herein provides a method for initializing a computer system, which includes a Central Processing Unit (CPU), a Trusted Root Device and a Trusted Platform Module (TPM). The method includes authenticating a boot code of the CPU using the Trusted Root Device, and booting the CPU using the authenticated boot code. A challenge-response transaction, in which the TPM authenticates the Trusted Root Device, is initiated by the CPU following booting of the CPU. Only in response to successful authentication of the Trusted Root Device using the challenge-response transaction, a resource used in operating the computer system is released from the TPM.

In some embodiments, the challenge-response transaction is based on a secret key stored in the Trusted Root Device and in the TPM. In an embodiment, initiating the challenge-response transaction includes refraining from exposing the secret key insecurely on any interface of the computing system.

In some embodiments, initiating the challenge-response transaction includes, using the CPU, requesting a challenge from the TPM and forwarding the challenge to the Trusted Root Device, and obtaining a response to the challenge from the Trusted Root Device and forwarding the response to the TPM. In a disclosed embodiment, releasing the resource from the TPM includes releasing a decryption key for decrypting encrypted content of the computer system. In another embodiment, releasing the resource from the TPM includes releasing an identity key for proving an identity of a user or of the computer system.

There is additionally provided, in accordance with an embodiment of the present invention, a computer system including a Central Processing Unit (CPU), a Trusted Root Device and a Trusted Platform Module (TPM). The Trusted Root Device is configured to authenticate a boot code of the CPU using the Trusted Root Device. The CPU is configured to boot using the authenticated boot code, and, after booting, to initiate a challenge-response transaction in which the TPM authenticates the Trusted Root Device. The TPM is configured to release a resource, for use in operating the computer system, only in response to a successful authentication of the Trusted Root Device using the challenge-response transaction.

The present invention will be more fully understood from the following detailed description of the embodiments thereof, taken together with the drawings in which:

DETAILED DESCRIPTION OF EMBODIMENTS

Overview

Figure 1:
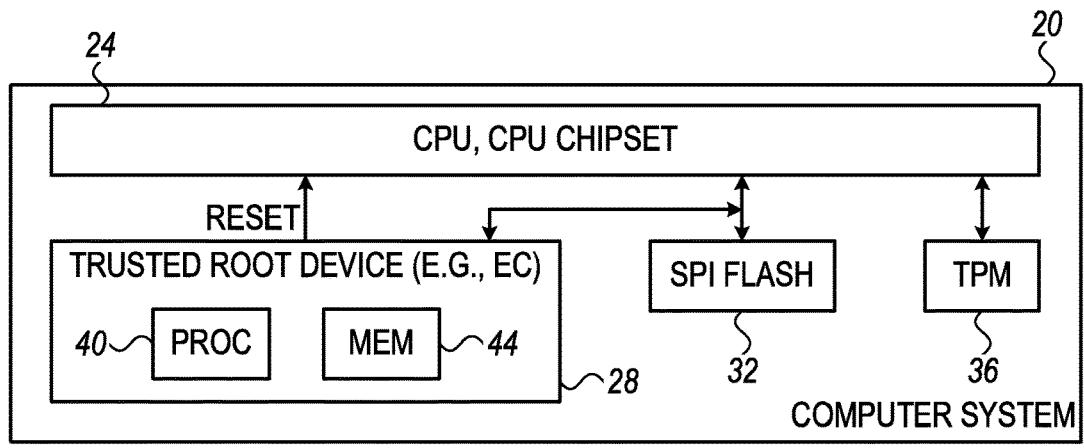
FIG. 1 is a block diagram that schematically illustrates a computer system, in accordance with an embodiment of the present invention.

Embodiments of the present invention that are described herein provide improved methods and apparatus for secure booting and initialization of computer systems.

In some embodiments, a computer system comprises a Central Processing Unit (CPU), a Trusted Platform Module (TPM) and a Trusted Root Device. In the present context, a Trusted Root Device is a device that behaves in a consistent and expected manner, performs verified boot, enforces boot policies and/or authenticates the computer-system boot code. The embodiments described herein refer mainly to an Embedded Controller (EC) as an example of a Trusted Root Device, for the sake of clarity. Other examples are provided below.

The computer system further comprises a non-volatile memory, e.g., a Flash memory device, which holds the boot code of the CPU. In some embodiments the CPU boot code may comprise code that carries out run-time services such as Unified Extensible Firmware Interface (UEFI) or Basic Input-Output System (BIOS) code. The non-volatile memory may also comprise boot code for the Trusted Root Device (TRD).

Typically, one of the tasks of the TRD is to authenticate the CPU boot code before allowing the CPU to run it. This task typically cannot be performed by the TPM, because the TPM is usually a slave device that is activated by the CPU and cannot initiate security checks. In some embodiments the embedded controller (EC) fulfills the role of a TRD, and therefore, references to EC also refer to TRD. In an example embodiment, the boot process begins with the EC holding the CPU in a reset state. The EC reads the CPU boot code from the non-volatile memory and authenticates it, and, if authentication is successful, releases the reset state and allows the CPU to load and run the boot code.

One possible vulnerability of the above mechanism is that an attacker might replace the EC with a rogue EC, and in this manner boot the CPU with a different CPU boot code. In this manner an attacker may perform various unauthorized actions, e.g., access system or user code or data. In some embodiments described herein, this vulnerability and other possible security risks are overcome by performing secure binding of the EC and the TPM.

In some embodiments, a secret key is written into the TPM and the EC of a given computer system, in a secure environment, e.g., during manufacturing or testing of the computer system. The secret key should not be accessible (at least not insecurely) to any other system element and not transferred over any system interface (at least not insecurely). Immediately following the verified boot process described above, the CPU initiates a challenge-response transaction between the TPM and the EC using the secret key.

In an example embodiment, the CPU requests and receives from the TPM a challenge that can only be responded to using the secret key that is shared by the EC and TPM. The CPU transfers the challenge to the EC, and then transfers the EC's response to the TPM for verification. Only upon verifying that the response is correct, meaning that the EC is indeed the Trusted Root Device holding the secret key, the TPM releases a key (or other resource, e.g., TPM-controlled GPIO) that enables operation of the computer system. One example of such a resource is a Full Volume Encryption (FVE) key for decrypting the content of a system disk. Another example is an identity key used for provide the identity of the user or system, for allowing access to a certain service.

The disclosed binding mechanism protects the computer system from attacks that involve replacement of the EC (or other Trusted Root Device). The disclosed solution uses the existing trustworthy security functionality offered by the TPM, even when the TPM is a slave device that cannot initiate security checks.

System Description

FIG. 1 is a block diagram that schematically illustrates a computer system 20, in accordance with an embodiment of the present invention. System 20 may comprise, for example, a server, a personal computer, a workstation, a laptop, tablet or other mobile computing device, or any other suitable computing platform. FIG. 1 is a simplified diagram, showing only elements of the computer system that are directly relevant to the disclosed techniques.

In the present example, computer system 20 comprises a Central Processing Unit (CPU) and CPU chipset 24, referred to herein simply as "CPU" for brevity. CPU 24 runs, for example, an operating system of the computer system, and various user programs. Among other tasks, CPU runs runtime services such as a Unified Extensible Firmware Interface (UEFI) or Basic Input-Output System (BIOS), which initializes the various elements of the computer system during the boot process, and provides basic runtime services.

Computer system 20 further comprises a Trusted Platform Module (TPM) 36, which performs functions such as protecting and reporting system integrity measurements, storing cryptographic keys used to authenticate reported measurements, authenticating identity and providing additional security functionality such as cryptographic key management, random number generation, sealing of data, controlling secured general purpose I/O pins (GPIO) and other suitable functions.

Computer system 20 additionally comprises a non-volatile memory, in the present example a Serial Peripheral Interface (SPI) Flash device 32. SPI Flash 32 stores the CPU boot code, i.e., the program code that CPU 24 runs during the boot process.

Computer system 20 also comprises a trusted root device, in the present example an Embedded Controller (EC) 28. EC 28 comprises a processor 40 and an internal memory 44. Among other tasks, EC 28 carries out a verified boot process of the BIOS, as will be explained below. This process typically cannot be performed by TPM 36, because the TPM is typically a slave device that is activated by the CPU.

The embodiments described herein refer mainly to Embedded Controller (EC) 28 as an example of a trusted root device, for the sake of clarity. ECs may be used, for example, in laptops and other mobile computers. In alternative embodiments, the trusted root device may comprise, for example, a Super-I/O controller (e.g., in desktop computers), a Baseboard Management Controller (BMC—e.g., in servers), or any other suitable controller.

The configuration of computer system 20 shown in FIG. 1 is an example configuration that is depicted purely for the sake of conceptual clarity. In alternative embodiments, any other suitable configuration can be used. For example, TPM 36 may be connected as an additional slave on the same bus as SPI Flash device 32. Elements that are not mandatory for understanding of the disclosed techniques have been omitted from the figure for the sake of clarity.

In various embodiments, the different elements of computer system 20 may be implemented using any suitable hardware, such as using one or more discrete components, one or more Application-Specific Integrated Circuits (ASICs) and/or one or more Field-Programmable Gate Arrays (FPGAs). Some computer system elements may be implemented in software, or using a combination of software and hardware elements.

In some embodiments, CPU 24 comprises a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Binding of TPM and Trusted Root Device

A possible attack scenario on computer system 20 is replacement of EC 28 with a rogue EC. Unless accounted for, such an attack might succeed in booting CPU 24 using an unauthorized CPU boot code. In this manner an attacker might gain access to information stored in system 20, e.g., to system or user code or data. In some embodiments, such attacks are mitigated by securely binding EC 28 and TPM 36.

Figure 2:
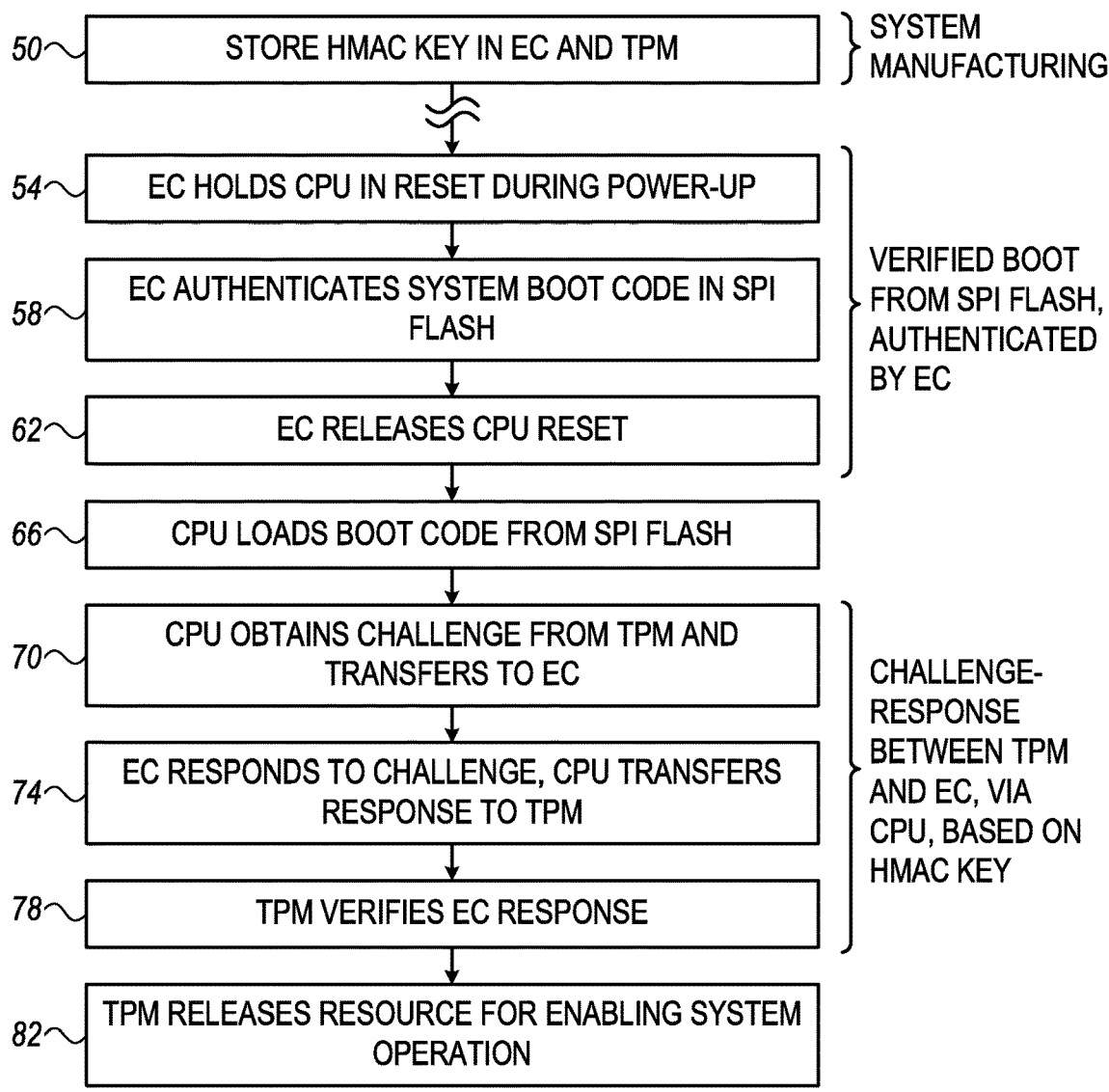
FIG. 2 is a flow chart that schematically illustrates a method for secure initialization of a computer system, in accordance with an embodiment of the present invention.

FIG. 2 is a flow chart that schematically illustrates a method for secure initialization of computer system 20, in accordance with an embodiment of the present invention.

The method begins at a binding step 50, in which a secret key is stored in EC 28, and a corresponding secret key is stored in TPM 36. In EC 28, the secret key may be stored, for example, in an internal Non-Volatile Memory (NVM) or One-Time Programmable (OTP) memory, or using a Physical Unclonable Function (PUF). In another embodiment, a seed for the secret key may be stored in NVM, OTP or PUF, but the secret key derived from the seed is stored in memory 44 of the EC. In yet another embodiment, the key is derived from a mix of EC 28 internal and external data. For example, the key or its seed can be held on external NVM, encrypted with another key which is stored inside EC 28.

Typically, the secret key is not stored (at least not insecurely) in any other component of system 20, and is not exposed at run-time (at least not insecurely) on any of the interfaces of system 20. Step 50 may be performed, for example, before providing system 20 to the end-user, e.g., during manufacturing, final testing or initial configuration of the system.

In the present embodiment the secret key is used for deriving a Hash-based Message Authentication Code (HMAC). Alternatively, however, any other suitable secret key, cryptographic or otherwise, can be used. In one alternative embodiment, a public/private key scheme can be used instead of an HMAC key. In this embodiment, the public key is used by the TPM and a private key is stored in the EC. The TPM uses the public key to verify a signature generated by the EC.

At some later point in time, when system 20 is powered-up, processor 40 of EC 28 ensures that the boot code of CPU 24 is authentic before allowing the main CPU boot process to initiate. In some embodiments, upon power-up, processor 40 holds CPU 24 in a reset state, at a reset holding step 54. While the CPU is in a reset state, processor 40 (typically running from internal memory 44) authenticates the CPU boot code that is stored in SPI Flash 32, at an authentication step 58. EC 28 is typically connected directly to Flash 32 for this purpose, so that the EC is able to read from Flash 32 independently of CPU 24.

If authentication fails, the EC may take any suitable responsive action, e.g., in accordance with a predefined Trusted Root Device policy stored therein. If authentication is successful, EC 28 releases the reset state of CPU 24, at a reset releasing step 62. Once the CPU reset has been released, CPU 24 loads the CPU boot code from SPI Flash 32, at a boot loading step 66.

Following steps 54-62, the CPU boot code has been authenticated and approved by EC 28. At this stage, however, there is no guarantee that the EC itself is trustworthy. To verify that the EC is trustworthy (e.g., not replaced by a rogue EC), CPU 24 initiates a challenge-response transaction between EC 28 and TPM 36. This transaction is based on the HMAC key (or other secret key) that was shared between the EC and TPM at step 50 above.

At a challenging step 70, CPU 24 requests and receives from TPM 36 a challenge. The CPU transfers the challenge to EC 28. At a response step 74, processor 40 of EC 28 responds to the challenge using the HMAC key, e.g., signs the challenge using the HMAC key. The CPU transfers the EC response to the TPM. At a response verification step 78, TPM 36 verifies the EC response, e.g., verifies the signature using the HMAC key. The challenge-response transaction is performed using the HMAC key, but without exposing the HMAC key itself on any interface.

If the response fails, TPM 36 initiates any suitable responsive action, e.g., preventing access to resources or services in accordance with a predefined Trusted Root Device policy stored therein. If the response is correct, TPM 36 concludes that the EC is trustworthy, since only the genuine EC has access to the HMAC key. In such a case, the TPM releases a resource that enables subsequent operation of system 20. Any suitable resource, e.g., key, can be used for this purpose. In the present context, the term "releasing a resource" refers to actions such as releasing content of a resource, allowing access to a resource, allowing usage of a resource, or the like.

In one example, at least some of the content of a disk in system 20 is encrypted, and the key released by TPM 36 at step 82 is a key for decrypting this content. Examples of such encryption schemes are Full Volume Encryption (FVE) or Full Disk Encryption (FDE—such as Microsoft Bit-Locker®). When using the above scheme, an attacker who replaces EC 28 with a rogue EC will not be able to access the encrypted user or system data. As part of the disk encryption provisioning, the challenge-response transaction of steps 70-78 should be added to the protected resource or service authorization policies in TPM 36, possibly in addition to credentials such as a Personal Identification Number (PIN) or Platform Configuration Registers (PCR). In another example, either instead of or in addition to a decryption key, the key released by TPM 36 at step 82 may comprise an identity key for allowing access to a certain service.

Although the embodiments described herein mainly address secure initialization of a computer, the methods and systems described herein can also be used in other applications, such as in secure initialization of other device having a main CPU, a TPM, and some additional controller used for authentication of the CPU boot code. Such devices may comprise, for example, mobile communication of computing devices, industrial computing devices, automotive or Internet-of-Things (IoT) devices, or any other suitable devices.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for initializing a computer system that includes a Central Processing Unit (CPU), a non-volatile memory that holds a boot code of the CPU, a controller and a Trusted Platform Module (TPM), the method comprising:
   reading the boot code of the CPU, by the controller, from the non-volatile memory, independently of the CPU, and authenticating the read boot code of the CPU using the controller;
   in response to successful authentication of the boot code by the controller, allowing the CPU to read the boot code from the non-volatile memory and to boot using the authenticated boot code;
   following booting of the CPU, ascertaining by the CPU that the controller is trustworthy, and that the boot code that the controller authenticated for the CPU is trustworthy, by:
      initiating by the CPU a challenge-response transaction in which (i) the CPU requests a challenge from the TPM and forwards the challenge to the controller, (ii) the CPU obtains a response to the challenge from the controller and forwards the response to the TPM, and (iii) the TPM authenticates the controller using the response,
      wherein the challenge-response transaction is based on a secret key stored in the controller and in the TPM, and wherein initiating the challenge-response transaction comprises refraining from exposing the secret key insecurely on any interface of the computing system; and
      only in response to successful authentication of the controller using the challenge-response transaction, releasing from the TPM a resource used in operating the computer system.

2. The method according to claim 1, wherein releasing the resource from the TPM comprises releasing a decryption key for decrypting encrypted content of the computer system.

3. The method according to claim 1, wherein releasing the resource from the TPM comprises releasing an identity key for proving an identity of a user or of the computer system.

4. A computer system comprising a Central Processing Unit (CPU), a non-volatile memory that holds a boot code of the CPU, a controller and a Trusted Platform Module (TPM), wherein:

the controller is configured to read the boot code of the CPU from the non-volatile memory, independently of the CPU, to authenticate the read boot code of the CPU, and, in response to successful authentication of the boot code by the controller, to allow the CPU to read the boot code from the non-volatile memory and to boot using the authenticated boot code;

the CPU is configured to boot using the authenticated boot code, and, after booting, to ascertain that the controller is trustworthy, and that the boot code that the controller authenticated for the CPU is trustworthy, by initiating a challenge-response transaction in which (i) the CPU requests a challenge from the TPM and forwards the challenge to the controller, (ii) the CPU obtains a response to the challenge from the controller and forwards the response to the TPM, and (iii) the TPM authenticates the controller using the response, wherein the challenge-response transaction is based on a secret key stored in the controller and in the TPM, and wherein the CPU, the controller and the TPM are configured to refrain from exposing the secret key insecurely on any interface of the computing system; and the TPM is configured to release a resource, for use in operating the computer system, only in response to a successful authentication of the controller using the challenge-response transaction.

5. The computer system according to claim 4, wherein the resource released by the TPM is a decryption key for decrypting encrypted content on a disk of the computer system.

6. The computer system according to claim 4, wherein the resource released by the TPM is an identity key for proving an identity of a user or of the computer system.

7. The method according to claim 1, wherein initiating the challenge-response transaction comprises verifying that the controller has not been replaced with a rogue controller.

8. The computer system according to claim 4, wherein, in initiating the challenge-response transaction, the CPU is configured to verify that the controller has not been replaced with a rogue controller.

* * * * *